United States Patent
Patel et al.

(10) Patent No.: US 10,158,385 B1
(45) Date of Patent: Dec. 18, 2018

(54) HOLSTER PROVIDING ANTENNA COVERAGE

(71) Applicant: MOTOROLA SOLUTIONS, INC, Chicago, IL (US)

(72) Inventors: Chirayu M. Patel, Pembroke Pines, FL (US); Edmund A. Laryea, Sunrise, FL (US); Branko Avanic, Miami, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/909,665

(22) Filed: Mar. 1, 2018

(51) Int. Cl.
 *H04B 1/08* (2006.01)
 *A45F 5/02* (2006.01)
 *H04B 3/36* (2006.01)

(52) U.S. Cl.
 CPC ............. *H04B 1/088* (2013.01); *A45F 5/021* (2013.01); *H04B 3/36* (2013.01); *A45F 2200/0516* (2013.01)

(58) Field of Classification Search
 CPC ............ H04B 1/088; H04B 3/36; A45F 5/021
 USPC .......................................................... 455/351
 See application file for complete search history.

(56) References Cited

U.S. PATENT DOCUMENTS

| 3,370,236 | A | * | 2/1968 | Walker | ................... H04B 1/385 224/674 |
|---|---|---|---|---|---|
| 3,720,874 | A | | 3/1973 | Gorcik et al. | |
| 5,936,581 | A | | 8/1999 | Roshitsh et al. | |
| 9,577,695 | B2 | | 2/2017 | Huang | |
| 2005/0057404 | A1 | | 3/2005 | Demicco et al. | |
| 2012/0262350 | A1 | * | 10/2012 | Tesh | ....................... H01Q 1/273 343/720 |

* cited by examiner

*Primary Examiner* — Sanh D Phu
(74) *Attorney, Agent, or Firm* — Barbara R. Doutre

(57) ABSTRACT

A holster (100) formed a body wearable housing (102), a cable (120), and a holster antenna (104) provide retention for a portable communication device (202) along with remote antenna coverage to another portable communication device (302) via the holster antenna (104).

22 Claims, 5 Drawing Sheets

HOLSTER PROVIDING ANTENNA COVERAGE

FIELD OF THE INVENTION

The present invention relates generally to communication devices, and more particularly to the enhancement of antenna coverage in portable communication devices.

BACKGROUND

Communication systems, particularly those used in public safety environment, such as law enforcement, fire rescue, and other mission-critical environments, typically rely on portable radio operations. It is important that such devices provide good antenna coverage. Portable radios which are worn on the body, such as on a belt, facilitate user interface operation and promote a hands-free environment, which is important when working in public safety applications. However, wearable devices may suffer degraded antenna coverage due to the very fact that they are worn on the body. Loss of antenna coverage can be particularly problematic to land mobile radios worn at the belt and operating in public safety environments. Additionally, in a two device system where the belt worn radio is used in conjunction with a body worn accessory, such as a body worn accessory worn at the shoulder, the ability to improve antenna coverage of the belt worn radio becomes extremely challenging.

Accordingly, it would be desirable to enhance antenna coverage of a body wearable communication device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
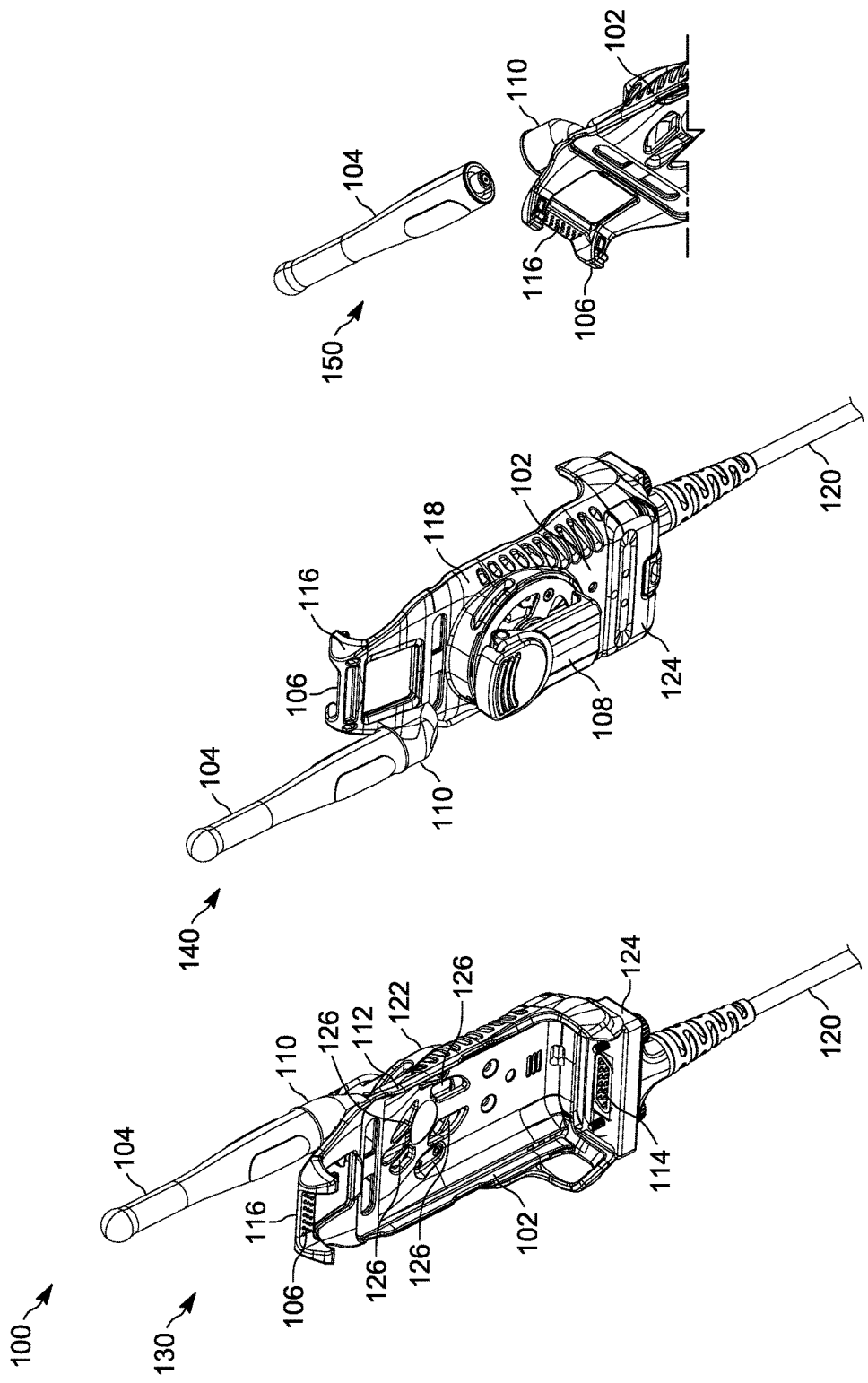
FIG. 1 is a holster formed in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein an apparatus and system providing enhanced antenna coverage for a portable communication device, such as a portable radio worn at the belt. The apparatus comprises a body worn holster, worn at the shoulder, for retaining and releasing a secondary electronic device, such as an electronic video camera, operating as an accessory to the belt worn device. In accordance with the embodiments, the holster comprises an antenna and a cabled interface which provide a radio frequency (RF) signal path between the holster and the portable radio. The holster with cabled interface may further provide audio and data pairing between the portable radio and the latched accessory. Hence, the two devices, although operating over different networks, can operate collaboratively via the audio and data pairing while the antenna of the shoulder worn holster provides improved antenna coverage to the portable radio worn at the belt. Wearing such devices on the body facilitates user interface operation and promotes a hands-free environment, which is advantageous when working in public safety applications.

FIG. 1 is a holster 100 formed in accordance with some embodiments. Holster 100 is shown in three separate views as: a front view 130, a back view 140, and a side view 150. The holster 100 is formed of a body wearable housing 102 for retaining and releasing a portable communication device 202, such as a video accessory, shown in FIG. 2. In accordance with the embodiments, the holster 100 further comprises an antenna 104 coupled to, or integrated with, the body wearable housing 102, the antenna providing remote antenna coverage for another body worn portable communication device 302, such as the belt worn radio, shown in FIG. 3. The antenna 104 of the holster 100 will also be referred to as a holster antenna 104.

In accordance with some embodiments, the body wearable housing 102 is preferably formed of a shoulder mountable bracket having a latch 106 for retaining and releasing the portable communication device 202. The latch 106 is preferably located at a top portion 116 of body wearable housing 102. A clip 108 is mounted to a back portion 118 of the body wearable housing 102 for attaching and detaching the holster from a body worn garment, such as garment 402 shown in FIG. 4. The body wearable housing 102 is preferably formed of a stiff ruggedized plastic having a recessed area for receiving the portable communication device. Various openings and cutouts are provided within the body wearable housing 102 to facilitate and align access to functions of the portable communication device, such as audio porting, for example speaker porting 126. In accordance with some embodiments, the antenna 104 is an external antenna coupled to the body wearable housing 102 via an antenna ferrule 110. In some embodiments, the antenna 104 may also alternatively be permanently attached to the body wearable housing 102.

In accordance with some embodiments, a radio frequency (RF) interface 112, such as a coaxial cable, insulated wire, transmission line or other suitable RF interface, is embedded within a side portion 122 of the body wearable housing 102. The RF interface 112 couples between the antenna 104 to a cable connector interface 114. The cable connector interface 114 is preferably located at a bottom portion 124 of the body wearable housing 102.

In accordance with some embodiments, the holster 100 further comprises a cable 120 coupled to the body wearable housing 102 at cable connector interface 114. Thus, the RF interface 112 provides conducted RF connectivity between the cable 120 and the holster antenna 104. The holster antenna 104 thus advantageously provides remote antenna coverage for the other portable communication device 302, such as the portable radio of FIG. 3.

Figure 2:
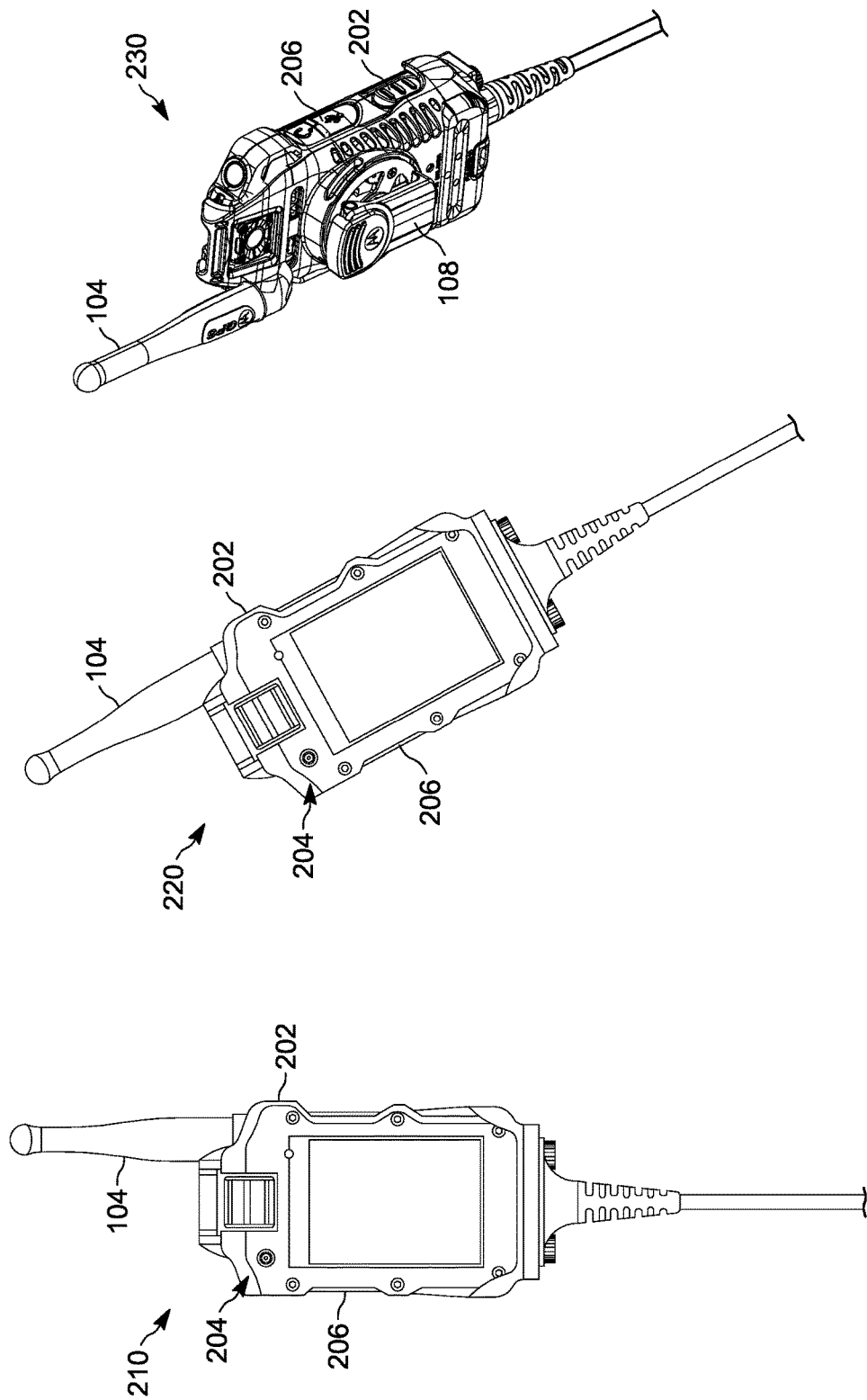
FIG. 2 is the holster of FIG. 1 having a communication device retained therein in accordance with some embodiments.

In accordance with some embodiments, the cable 120 may also be used to pair the portable communication device 202 of FIG. 2, such as a video recording accessory, to the other body worn portable communication device 302, such as the portable radio of FIG. 3. The pairing may be audio pairing and/or data pairing. In accordance with some embodiments, a printed circuit board (not shown) may provide electronics for signal conditioning and routing of audio and data lines within the holster 100.

FIG. 2 provides three separate views shown as: a first front view 210, a second front view 220, and a back view 230 of the holster of FIG. 1 having portable communication device 202 retained therein in accordance with some embodiments. The holster 100 is formed of the body wearable housing 102 for retaining and releasing the portable communication device 202, preferably a video accessory. The portable communication device 202 is a non-LMR device that pairs, via cable 120, to the other body worn portable communication device 302, such as the portable radio of FIG. 3, which is preferably an LMR radio. For example, the portable communication device 202 may be a long term evolution (LTE) device operating over an LTE network via an internal antenna (not shown) providing video recording functionality. Alternatively, the portable communication device 202 may be a Wi-Fi device or other broadband device. The holster 100 retains and releases the portable communication device 202 via latch 106, and the holster 100 provides body wearable capability via clip 108, thereby providing for a shoulder worn portable communication device.

Figure 3A:
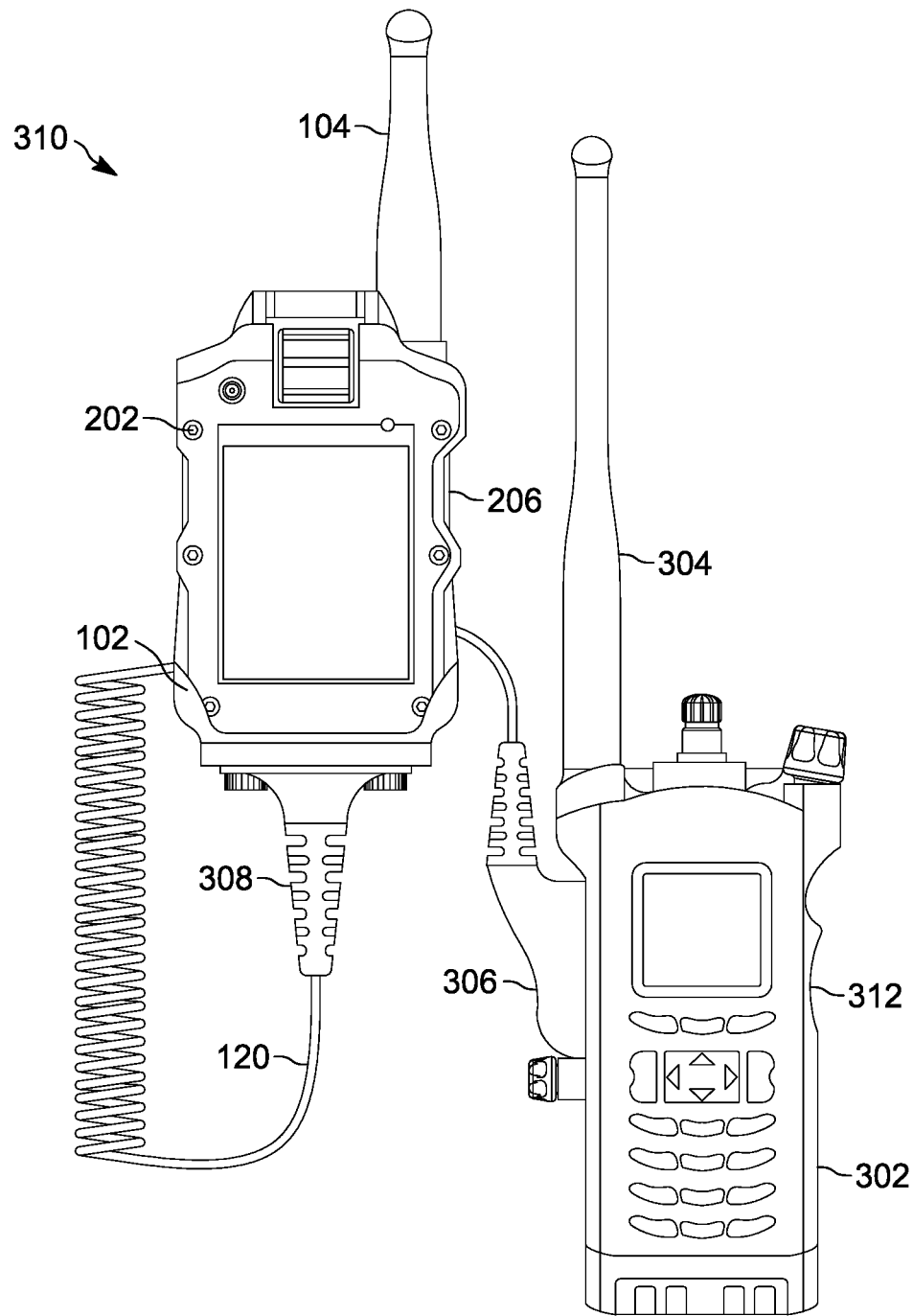
FIG. 3A is a communication system in accordance with some embodiments.

FIG. 3A is a communication system 310 in accordance with some embodiments. Communication system 310 comprises first portable communication device 302 and second portable communication device 202, the holster 100 having antenna 104. The holster 100 provides retention and release of the second portable communication device 202. The cable 120 is coupled to the holster 100, the cable provides pairing of the first portable communication device 302 to the second communication device 202. In accordance with the embodiments, the antenna 104 of the holster 100 provides remote_ antenna coverage for the first portable communication device 302 when the portable communication device is worn on the body. A controller 404 (shown in FIG. 4) within the first portable communication device 302 controls selectively switching on and off the antenna 304 of the first portable communication device 302 and the holster antenna 104, thereby controlling the antenna coverage to the first portable communication device 302 via the two antennas.

The cable 120 has a first end 308 that couples to the holster 100 and a second end having a global communications accessory interface (GCAI) interface connector 306 that provides coupling capability to the plurality of different portable communication devices 302 and 322. The radio controller of portable communication device 302 selectively controls the operation of antenna 104 and 304 in response to the GCAI connector being coupled to and removed from the first portable communication device 302.

In accordance with some embodiments, the first portable communication device 302 is preferably a land mobile radio (LMR) having an LMR antenna 304, providing two-way radio communications (half-duplex) under the control of a push-to-talk (PTT) button 312. The portable land mobile radio (LMR) provides two-way radio communication operates over, for example, UHF, VHF, 700/800/900 MHz bands. The holster antenna 104 is also a LMR antenna. In accordance with some embodiments, the second portable communication device 202 is a portable long term evolution (LTE) communication device having an internal LTE antenna. The LTE device 202 operates within an LTE network. In some embodiments the LTE device 202 provides video functionality. Alternatively, the second portable communication device could be some other broadband device operating over a broadband network.

In accordance with some embodiments, the cable 120 provides an RF signal path from the connector 306 to the holster antenna 104. In accordance with some embodiments, the cable 120 further provides audio and data signal paths from the LMR radio 302 to the LTE device 202. The LTE device 202 has the push-to-talk (PTT) button 206, the microphone 204 and a speaker (located on back of device). These radio functions are remoted from the LMR device 302 to the LTE device 202 via cable 120.

Figure 3B:
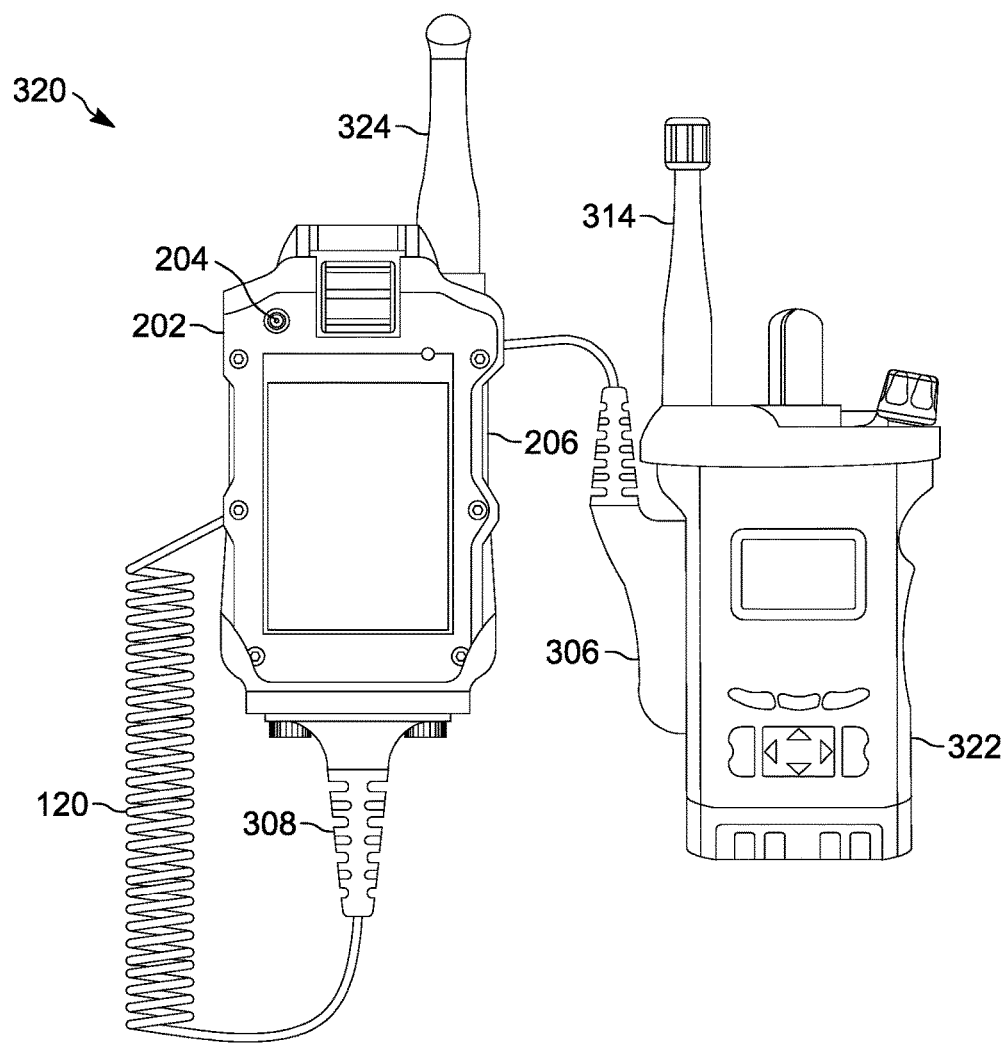
FIG. 3B is another communication system in accordance with some embodiments.

FIG. 3B is another communication system 320 in accordance with some embodiments. FIG. 3B is provided to show that holster 100 provides coupling capability to another radio 322 operating in a different band using a different antenna 314. The holster 100 has been configured for the different radio 322 by changing out the holster antenna 104 (of FIG. 3A) and replacing it with holster antenna 324. Thus, different radios and different bands of operation can be accommodated by removing antenna 104 and replacing it with the appropriate antenna for that radio. The GCAI connector 306 of cable 120 advantageously provides coupling capability to a plurality of different portable communication devices.

Figure 4:
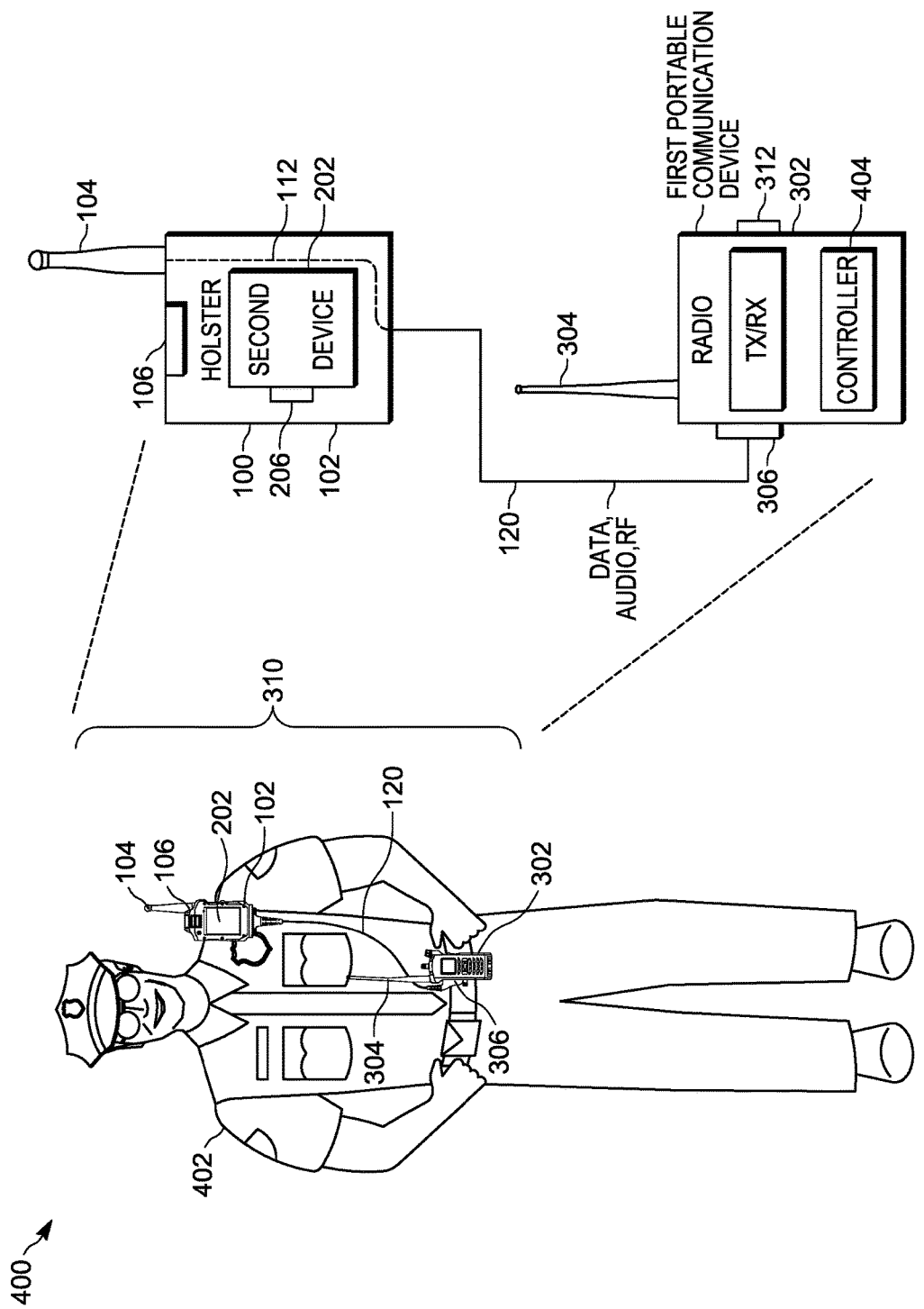
FIG. 4 shows a communication system in a body worn environment in accordance some embodiments.

FIG. 4 shows the communication system 310 in a body worn environment in accordance some embodiments along with a block diagram 400 of the elements associated therewith. The body wearable housing 102 provides the shoulder mountable bracket having the latch 106 for retaining and releasing the portable communication device 202. The holster 100 is attached to a body worn garment 402 via clip 208 (shown in previous views). The user is thus able to attach and detach the holster 100 to and from garment 402 using the clip 108, and the user is further able to remove the portable communication device 202 from the holster 100 using the latch 106.

As previously described, the communication system 310 comprises first portable communication device 302, second portable communication device 202, and holster 100 having an antenna 104, also referred to as a holster antenna. The first portable communication device 302 is a belt worn device. The holster 100 retains and releases the second portable communication device 202 via latch 106. The cable 120 is coupled, or integrated with the holster 100. The holster antenna 104 provides remote antenna coverage for the first portable communication device 302, via an RF signal path within the cable 120. The cable 120 provides pairing (audio and data) of the first portable communication device 302 to the second communication device 202.

The first portable communication device 302 has a radio controller 404 that detects that holster antenna 104 being connected via the connector interface 306 of the cable 120. The cable connection provides an indication to the controller that communication system 310 is in a body worn condition. The antenna 304 of first portable communication device 302 may be switched off and the holster antenna 104 turned on when the first portable communication device is worn on the body. Alternatively, the controller 404 may, for example in applications of diversity, dual-watch, or other, keep both the holster antenna 104 and the radio antenna 304 activated. Hence, the internal radio controller 404 of radio 302 controls the RF path between the first portable communication device 302 and holster antenna 104 for optimized signal coverage.

The holster antenna 104 is preferably a land mobile radio (LMR) antenna, and the first portable communication device 302 is preferably a land mobile radio, and the second portable communication device 202 is a portable long term evolution (LTE) communication device having an internal LTE antenna. The user may access PTT 206, microphone 204, and speaker functionality at second communication device 202 as these functions are remoted from the first portable communication device 302 to secondary device 202 during body worn applications of the communication system.

Accordingly, there has been provided a body wearable holster that retains, tethers and pairs a secondary body worn electronic device, such as a video recording accessory worn at the shoulder, to a primary portable communication device worn on the body, such as on a belt. The tethered coupling provides for an RF signal path from the radio antenna to the holster antenna for enhanced antenna coverage of the primary communication device. The tethered coupling further provides advantageous pairing of data and audio between the two devices. Wearing such devices on the body facilitates user interface operation and promotes a hands-free environment, advantageous to public safety applications.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A holster, comprising:
   a body wearable housing for retaining and releasing a portable communication device;
   a cable physically coupled to the body wearable housing; and
   an antenna electrically coupled to the cable and physically coupled to the body wearable housing.

2. The holster of claim 1, wherein the antenna coupled to the body wearable housing provides remote antenna coverage for another portable communication device.

3. The holster of claim 1, wherein the cable pairs the portable communication device to another portable communication device.

4. The holster of claim 1, wherein the cable conducts a radio frequency (RF) signal between the antenna of the holster and the other portable communication device.

5. The holster of claim 1, wherein the cable pairs audio and data between the portable communication device and another portable communication device, and the cable also conducts a radio frequency (RF) signal between the antenna of the holster and the other portable communication device.

6. The holster of claim 1, wherein the body wearable housing comprises:
a shoulder mountable bracket having a latch for retaining and releasing the portable communication device; and
a clip for attaching and detaching the holster from a body worn garment.

7. The holster of claim 6, further comprising:
an antenna ferrule incorporated into the body wearable housing, the antenna being coupled to the antenna ferrule, and
a radio frequency (RF) interface embedded within the shoulder mountable bracket and coupled to the antenna ferrule, the RF interface providing conducted RF connectivity to the cable.

8. The holster of claim 1, wherein the cable has a first end coupled to the holster and a second end interconnecting to the portable communication device.

9. The holster of claim 1, wherein the antenna is a land mobile radio (LMR) antenna.

10. The holster of claim 9, wherein the land mobile radio antenna of the holster provides enhanced antenna coverage for a land mobile radio coupled to the cable.

11. The holster of claim 1, wherein the antenna is a land mobile radio (LMR) antenna that provides a remote antenna to a land mobile radio coupled to the cable.

12. A communication system, comprising:
a first portable communication device,
a second portable communication device;
a holster having an antenna physically coupled, the holster for retaining and releasing the second portable communication device; and
a cable physically coupled to the holster and electrically connected to the antenna, the cable for pairing the first portable communication device to the second portable communication device, wherein the antenna of the holster provides remote antenna coverage for the first portable communication device when the first portable communication device is body worn.

13. The communication system of claim 12, wherein the first portable communication device comprises:
a radio antenna; and
a radio controller that controls a radio frequency (RF) path between the antenna of the holster and the radio antenna of the first portable communication device.

14. The communication system of claim 12, wherein the cable provides a radio frequency (RF) signal path between the first portable communication device and the antenna of the holster.

15. The communication system of claim 14, wherein the cable further provides audio pairing and data pairing between the first portable communication device and the second portable communication device.

16. The communication system of claim 12, wherein the antenna of the holster is a land mobile radio (LMR) antenna, and the first portable communication device is a land mobile radio, and the second portable communication device is a portable long term evolution (LTE) communication device having an internal LTE antenna.

17. The communication system of claim 12, wherein the first portable communication device is a belt worn device and the holster for retaining and releasing the second portable communication device is a shoulder worn holster.

18. The communication system of claim 12, wherein push-to-talk (PTT), microphone, and speaker functionality are accessible at the second portable communication device.

19. The communication system of claim 12, wherein the cable has first and second ends, wherein the first end is integrated to the holster and the second end comprises an interface connector for coupling to a plurality of different portable communication devices.

20. The communication system of claim 19, wherein the cable interface connector comprises a communications accessory interface (GCAI) connector.

21. The holster of claim 1, wherein the antenna is physically removable from the holster.

22. The communication system of claim 12, wherein the antenna is physically removable from the holster.

* * * * *